(12) United States Patent
Cartlidge

(10) Patent No.: US 7,738,026 B2
(45) Date of Patent: Jun. 15, 2010

(54) INCREASING FILL-FACTOR ON PIXELATED SENSORS

(75) Inventor: Andrew G. Cartlidge, 22 Commodore Pl., Palm Beach Gardens, FL (US) 33418

(73) Assignees: Andrew G. Cartlidge, Palm Beach Gardens, FL (US); Himanshu S. Amin, Solon, OH (US); Daniel B. Bortnick, Mentor, OH (US); Gregory Turocy, Moreland Hills, OH (US)

( * ) Notice: Subject to any disclaimer, the term of this patent is extended or adjusted under 35 U.S.C. 154(b) by 1061 days.

(21) Appl. No.: 11/120,226

(22) Filed: May 2, 2005

(65) Prior Publication Data
US 2006/0244851 A1 Nov. 2, 2006

(51) Int. Cl.
*H04N 5/225* (2006.01)
*G02B 13/20* (2006.01)

(52) U.S. Cl. .................. 348/340; 359/707
(58) Field of Classification Search .......... 348/40, 348/335, 340; 359/707
See application file for complete search history.

(56) References Cited

U.S. PATENT DOCUMENTS

| | | | | |
|---|---|---|---|---|
| 4,323,925 | A | * | 4/1982 | Abell et al. .................. 348/340 |
| 5,534,386 | A | | 7/1996 | Petersen et al. |
| 5,607,764 | A | * | 3/1997 | Konno et al. ................. 428/327 |
| 5,754,226 | A | | 5/1998 | Yamada et al. |
| 5,920,345 | A | | 7/1999 | Sauer |
| 6,058,281 | A | * | 5/2000 | Castenmiller ............... 399/118 |
| 6,166,389 | A | | 12/2000 | Shie et al. |
| 6,225,670 | B1 | | 5/2001 | Dierickx |
| 6,243,131 | B1 | * | 6/2001 | Martin ......................... 348/36 |
| 6,266,476 | B1 | | 7/2001 | Shie et al. |
| 6,301,051 | B1 | | 10/2001 | Sankur |
| 6,307,243 | B1 | | 10/2001 | Rhodes |
| 6,326,998 | B1 | | 12/2001 | Palum |
| 6,400,402 | B1 | | 6/2002 | Iwanaga |
| 6,529,678 | B2 | | 3/2003 | Shie et al. |
| 6,535,249 | B1 | | 3/2003 | Stavely |
| 6,567,122 | B1 | | 5/2003 | Anderson et al. |
| 6,624,850 | B1 | | 9/2003 | Guidash |
| 6,778,728 | B2 | | 8/2004 | Taylor et al. |
| 6,859,229 | B1 | | 2/2005 | Suda |
| 7,092,165 | B2 | * | 8/2006 | Morris et al. ............... 359/626 |
| 7,158,181 | B2 | * | 1/2007 | Cartlidge .................... 348/340 |
| 7,545,431 | B2 | * | 6/2009 | Cartlidge .................... 348/340 |
| 2002/0034014 | A1 | * | 3/2002 | Gretton et al. .............. 359/619 |
| 2004/0223071 | A1 | | 11/2004 | Wells et al. |

(Continued)

OTHER PUBLICATIONS

International Search Report for PCT/US05/15215 dated Feb. 24, 2006.

*Primary Examiner*—John M Villecco
(74) *Attorney, Agent, or Firm*—Turocy & Watson, LLP

(57) ABSTRACT

Disclosed are systems, devices, and methodologies that facilitate increasing the effective fill-factor of digital sensors. In general, fill-factor relates to the active area or photosensor region of the sensor with respect to the inactive area/deadzone or space between pixels. By increasing the effective fill-factor, transmission of optical information is increased to the sensor while mitigating information loss between pixels. A digital camera may contain a sensor that is responsive to electromagnetic radiation and a coherent scattering medium between the sensor and a lens that diffuses the electromagnetic radiation with respect to the sensor in order to increase the effective fill-factor.

21 Claims, 9 Drawing Sheets

U.S. PATENT DOCUMENTS

2004/0227822 A1* 11/2004 Cartlidge et al. ....... 348/207.99
2005/0190417 A1* 9/2005 Kremen ...................... 359/31
2005/0190418 A1* 9/2005 Kremen ...................... 359/31

* cited by examiner

ND FILL-FACTOR ON PIXELATED
INCREASING FILL-FACTOR ON PIXELATED SENSORS

TECHNICAL FIELD

The subject invention relates generally to digital imaging systems, and more particularly to systems and methods with improved sensor performance and design by maximizing the amount of information collected by the sensor.

BACKGROUND OF THE INVENTION

One area of concern to sensor array manufacturers is that of ensuring that the active area of their respective products (the pixel) covers the maximum amount of area such that there are substantially no gaps or minimal gaps between pixels. This amount of coverage is usually described as a percentage "fill-factor" and is computed as follows: fill-factor %=(pixel-pixel area)/(pixel active area)*100. In general, it is very difficult to achieve 100% fill-factor, and in some cases, the array process generally does not allow a large fill-factor such as is the case with CMOS sensor technology, for example. There are two primary reasons for achieving the goal of a high fill-factor which include:

1) To facilitate that a majority photons incident on the array are captured by the active parts of the array (i.e., increase sensitivity), and, 2) To facilitate that small structures in an image as presented to the array are not "lost in the spaces between pixels" whereby photons correlated with small structures are thus not captured by the active part of the pixel.

Some manufacturers attempt to achieve a large effective fill-factor by the application of arrays of lenslets to the surface of the sensor array. This approach has the advantage of increasing the effective fill-factor and the sensitivity of the array, but suffers from undesirable chromatic effects. Moreover, lenslet processes by nature pose numerous difficulties in precise manufacture of micron-sized lenslets, and the associated problems in precise positioning. Therefore, lenslet style solutions add significant cost to the overall production of sensor arrays and devices that contain sensor arrays.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to a system and methodology that facilitates imaging performance of digital sensors by associating a coherent scattering medium or component with a sensor array to achieve an optimized fill-factor for the array (e.g., effective 100% fill-factor). The coherent scattering medium acts to diffuse photons that may fall in the spaces of the array and thus enable image details that may have been lost by conventional approaches to be detected by the array. In addition to capturing these details, the subject invention allows for lower cost assembly of sensor arrays by mitigating the addition of complex components such as lenslets that are also difficult to manufacture and position.

One aspect of the invention relates to a digital cameras containing an image transfer medium; a sensor containing pixels, each pixel containing a photosensor region and a deadzone, the pixels having a pixel pitch; and a coherent scattering medium between the image transfer medium and the sensor, the coherent scattering medium operative to propagate a diffusion pattern of electromagnetic radiation to the sensor, the diffusion pattern at the sensor having a size of about the pixel pitch or less.

Another aspect of the invention relates to methods of making a digital camera, involving positioning a coherent scattering medium between an image transfer medium and a sensor, the sensor having a pixel pitch, the coherent scattering medium operative to propagate a diffusion pattern of electromagnetic radiation to the sensor, the diffusion pattern at the sensor having a size of about the pixel pitch or less.

In yet another aspect, a holographic diffuser, for example, is placed in proximity of a sensor array having a plurality of pixels (e.g., CMOS array, CCD array, and so forth) such that the diffuser creates a virtual point source with a diffusion angle such that a substantially-sharp point (e.g., infinitely-sharp point) present on the diffuser is then diffused or spread to cover about one pixel pitch which provides coherent spatial coupling between active and inactive areas of the sensor array. Thus, any information that may have been lost in the spaces between pixels is spread out across inactive or "deadzone" in order to fall on the active portions of the pixels. In other words, the deadzone is effectively removed, and the array can achieve an increased fill factor, and even an "effective 100% fill-factor." Also, the absolute resolution of the system can remain unchanged, as a diffused cone emanating from the diffuser can be engineered to generally not cover more than one pixel-pitch and thus preserving resolution.

In a system design example employing the subject diffuser (e.g., camera, copier, fax, microscope, telescope, video), relatively low-cost sensors can be made to perform (or outperform) very expensive and high-fill-factor sensors currently available. Additionally, highly pixelated arrays can be optimized for fill-factor performance by replacing expensive lenslet arrays with a coherent scattering medium.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Disclosed are systems, devices, and methodologies that facilitate increasing the effective fill-factor of digital sensors. In general, fill-factor relates to the active area or photosensor region of the sensor with respect to the deadzone/inactive area or space between pixels on the array. By increasing the effective fill-factor, transmission of increased/maximum amount of optical information to the active portions of the sensor is achieved while mitigating information loss between pixels on the sensor. In one aspect, an image detector system is provided. The system contains a coherent scattering medium and a pixelated sensor that is responsive to electromagnetic radiation such as visible light, for example. The coherent scattering medium diffuses the electromagnetic radiation with respect to the pixelated sensor in order to increase the effective fill-factor of the sensor. In one embodiment, the sensor system does not contain conventional lenslets, conventionally used to address fill-factor.

Systems adapted can include digital image processing from the respective sensors, if desired, along with storage (e.g., local database, image data transmissions to remote computers for storage/analysis) and display of the images produced in accordance with the invention (e.g., computer display, printer, film, and other output media). Remote signal processing of image data from the sensors can be provided, along with communication and display of the image data via associated data packets that are communicated over a network or other medium, for example.

Figure 1:
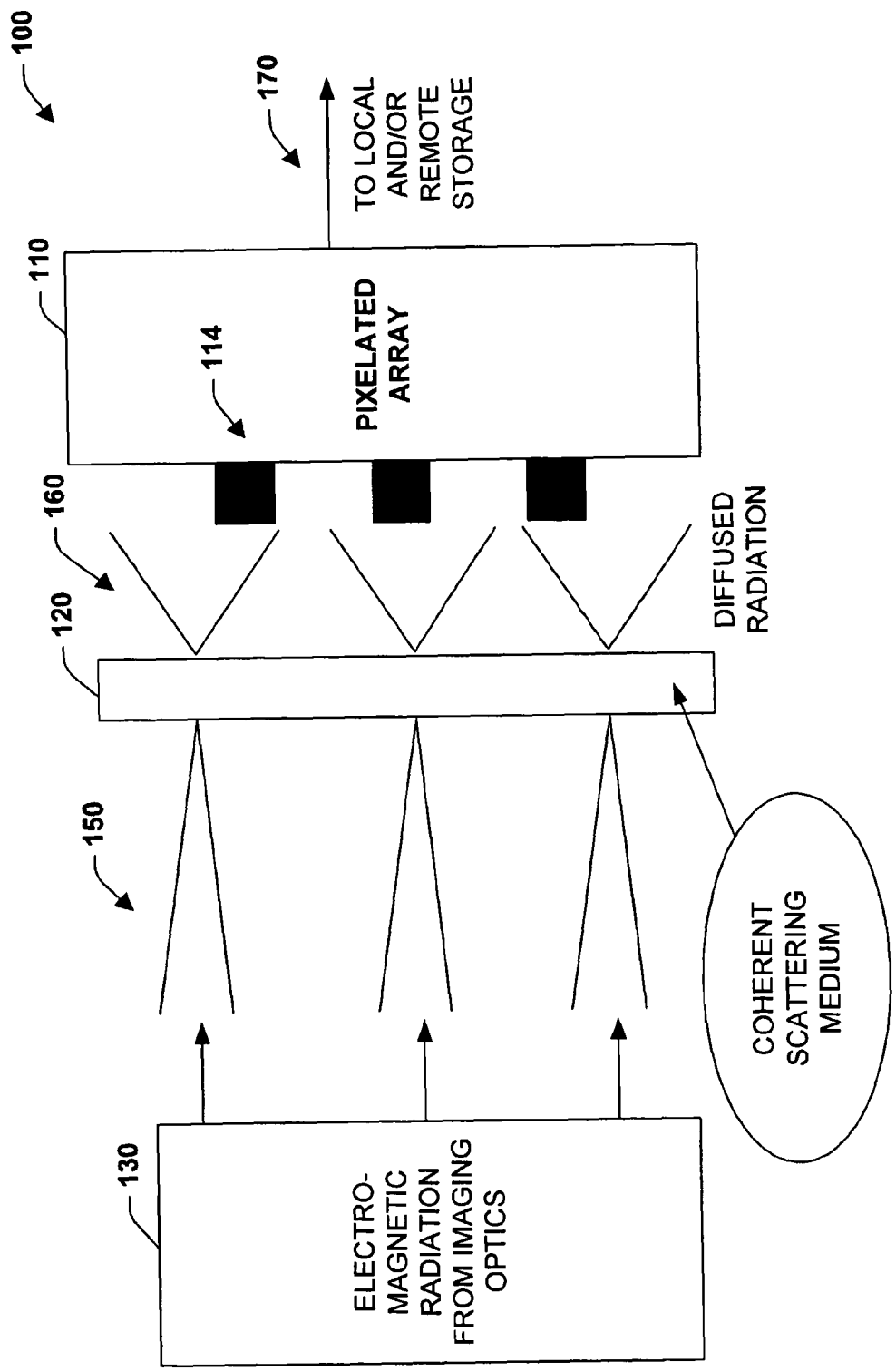
FIG. 1 is a schematic block diagram illustrating a coherent coupling system and sensor array in accordance with an aspect of the invention.

Referring initially to FIG. 1, a coherent coupling and sensor array system 100 is illustrated. The system 100 includes a pixelated sensor array 110 (or array) having one or more receptors such as pixels 114 or discrete energy detectors operably associated with a coherent scattering medium 120. The coherent scattering medium 120 is adapted or configured to disperse or diffuse radiation received from a source 130 (e.g., image transfer medium such as a camera lens) across the pixels 114 on the array 110. An image transfer media is at least partially transparent and transmits light or electromagnetic information that is used to form/view an image/object. Image transfer media generally include lenses, fiber optics, optical circuits, prisms, and the like. Examples of commercially available image transfer media, such as lenses, are those made by Bausch & Lomb, Canon, edmund Optics, Fujinon, Kahles, Kowa, Leica, Minolta, Minox, Meiji, Melles Griot, Mitutoyo, Nikon, Olympus, Pentax, Prior, Steiner, Swarovski, Swift, Unitron, Wild, Zeiss, and others. Examples of lenses that may be employed in the image transfer system include Plan-Neofluar, Plan Fluotar, Planapochromat, Plan, Achroplan, Epiplans, Achromat, Planachromats, Semiapochromatic, Apochromatic, Planapochromat, Fresnel, convex, concave, cylindrical, total internal reflection and the like.

As illustrated, energy points 150 from the source 130 are diffused into e.g., conical patterns at 160. In this manner, by dispersing the energy points 150 at the array 110 via the coherent scattering medium 120, an enhanced fill-factor for the array is promoted since the energy points are captured by the pixels 114 even if the points are not substantially aligned with the pixels. Thus, if the coherent scattering medium 120 were not present such as in conventional systems, the energy points or spots 150 may fall between the pixels 114 resulting in information being undetected by the array 110. It is to be appreciated that the coherent scattering medium 120 can produce shapes or patterns such as cones at 160 or other shapes that provide coherent spatial coupling between active and inactive areas of the pixelated sensor array 110.

It is noted that the pixelated sensor array 110 can be substantially any size, shape and/or technology (e.g., digital sensor, analog sensor, Charge Coupled Device (CCD) sensor, CMOS sensor, Charge Injection Device (CID) sensor, an array sensor, a linear scan sensor) including one or more receptors of various sizes and shapes, the one or more receptors being similarly sized or proportioned on a respective sensor to be responsive to energy such as light (e.g., visible, non-visible) received from the source 130. Also, the pixelated sensor array 110 can include an M by N array of pixels associated with the one or more receptors, where M and N represent integer rows and columns respectively.

As energy is received from the source 130, the array 110 provides an output 170 that can be directed to a local or remote storage such as a memory (not shown) and displayed from the memory via a processor and associated display, for example, without substantially any intervening digital processing (e.g., straight bit map from sensor memory to display), if desired. It is noted that local or remote signal processing of the image data received from the array 110 can also occur. For example, the output 170 can be converted to electronic data packets and transmitted to a remote or local system over a network (wireless or wired) for further analysis and/or display. Similarly, the output 170 can be stored in a local computer memory before being transmitted to a subsequent computing system for further analysis and/or display. Images can be transferred across the Internet (or other network) such as to a controller, e-mail address, Ethernet address, or web site, for example.

As is described in more detail below, the coherent scattering medium 120 can be a holographic diffuser in one example that is configured to create a diffusion pattern at 160 that is less than about the size of one pixel in the pixelated sensor array 110. It is to be appreciated however, that any coherent scattering medium 120 that facilitates coherent coupling of electromagnetic energy within the proximity of the pixelated sensor array 110 may be employed. Also, as can be appreciated, digital output from the array 110 can be employed to perform automated analysis and/or mapped to a display to enable manual inspection of an image. Furthermore, electromagnetic radiation from the source 130 can include substantially any type of energy to activate the array 110 such as coherent light, non-coherent light, visible light and non-visible light (e.g., infrared, ultra violet). In addition, the pixelated sensor array 110 and the coherent scattering medium 120 can be associated with a plurality of applications such as a camera, a copier, a fax machine, a microscope, a telescope, a telephone, handheld device such as a PDA, computer, a watch, and a video application, for example.

Figure 2:
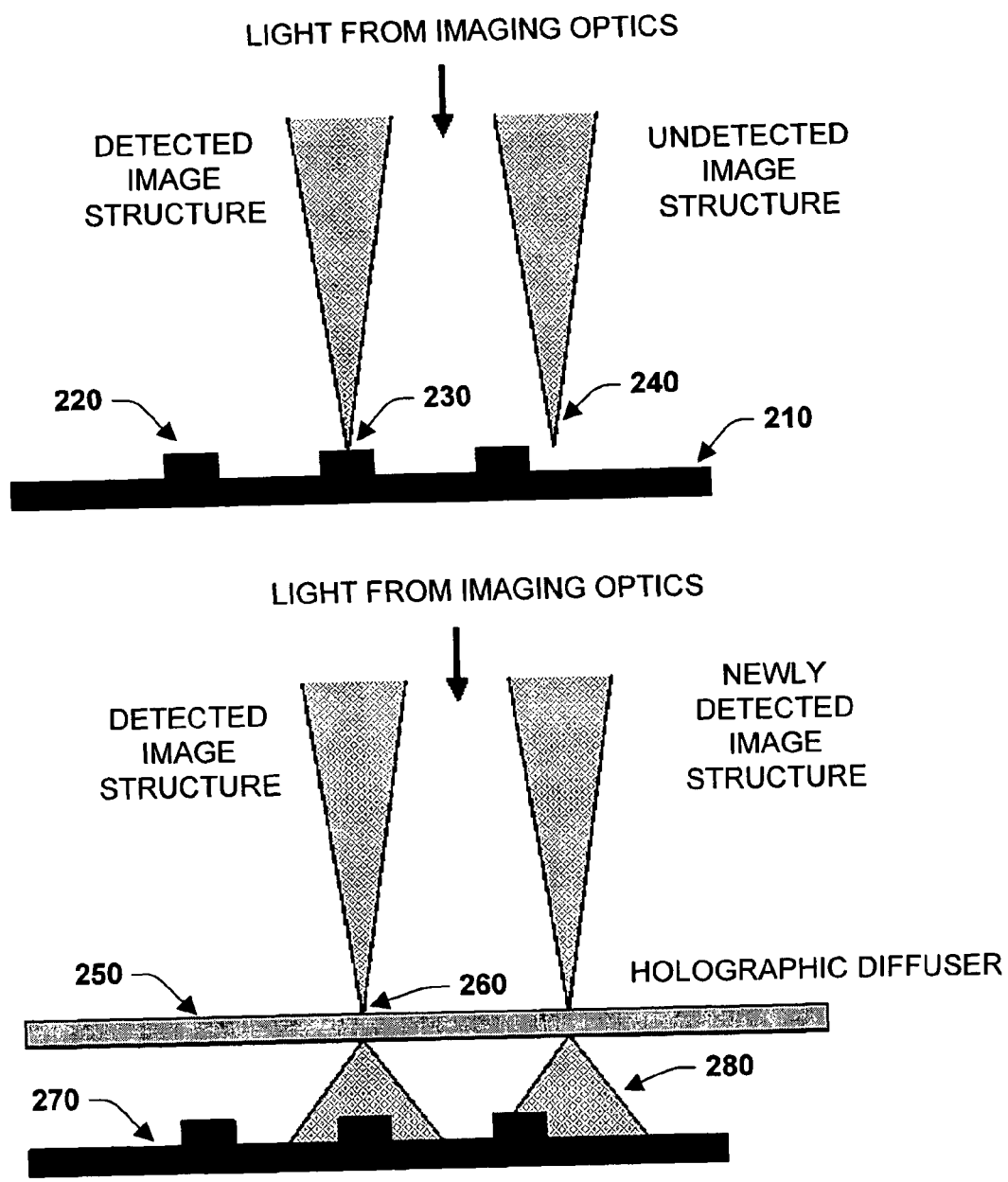
FIG. 2 illustrates holographic diffuser principles in accordance with an aspect of the invention.

Referring now to FIG. 2, holographic diffuser principles are illustrated in accordance with an aspect of the subject invention. In a "classical" design approach, such as a digital camera (or other similar instrument), the image is presented to the surface of a sensor array 210 having a plurality of pixels 220 without substantial concern towards correlating diffraction-limited spots to the array pixel-pitch, leading to a situation whereby it is possible that the image has spatial structures that are smaller than the physical size of the active portions of the pixel. This is illustrated at 230 where light (or energy) from imaging optics is captured by a sensor pixel and at reference numeral 240 where light from the imaging optics is not picked up by the active portions of the array 210. In this situation, parts of the image may well be unresolved, not due to diffraction or optical limitations, but due to the physical dimensions of the array pixels 220.

A holographic diffuser 250 can be positioned near an image plane at 260 and prior to a sensor array 270. A diffusion angle for a hologram 280 can be computed such that a minimal-sized spot in the image plane (close to diffraction limited, or at the resolving ability of the lenses) is diffused to cover about a single pixel interval on the array.

Computations for the diffusion angle are described in more detail below with respect to FIG. 3. While diffusion may be somewhat achieved with a simple ground glass (or similar) diffuser, the effect will not be comparable, as one of the properties of the holographic diffuser 250 is that information present at the diffuser surface is equally (or substantially equally) distributed over the diffused spot. Thus, for example, a fine line or other feature that may normally miss the active portion of a pixel would be diffused such that the information carried in the line would be available to the active part of the pixel. A possible side-effect of this may be that sharp images are slightly blurred, but generally only to the resolution of the array (the pixel-pitch) and thus, substantially no recovered information should be lost—on the contrary, extra information should be recovered from the "deadzones" on the array via the holographic diffuser 250. Generally, no intensity should be lost, as the holographic diffuser 250 merely redistributes photon statistics, and thus, the response of the array 270 should not be compromised.

Figure 3:
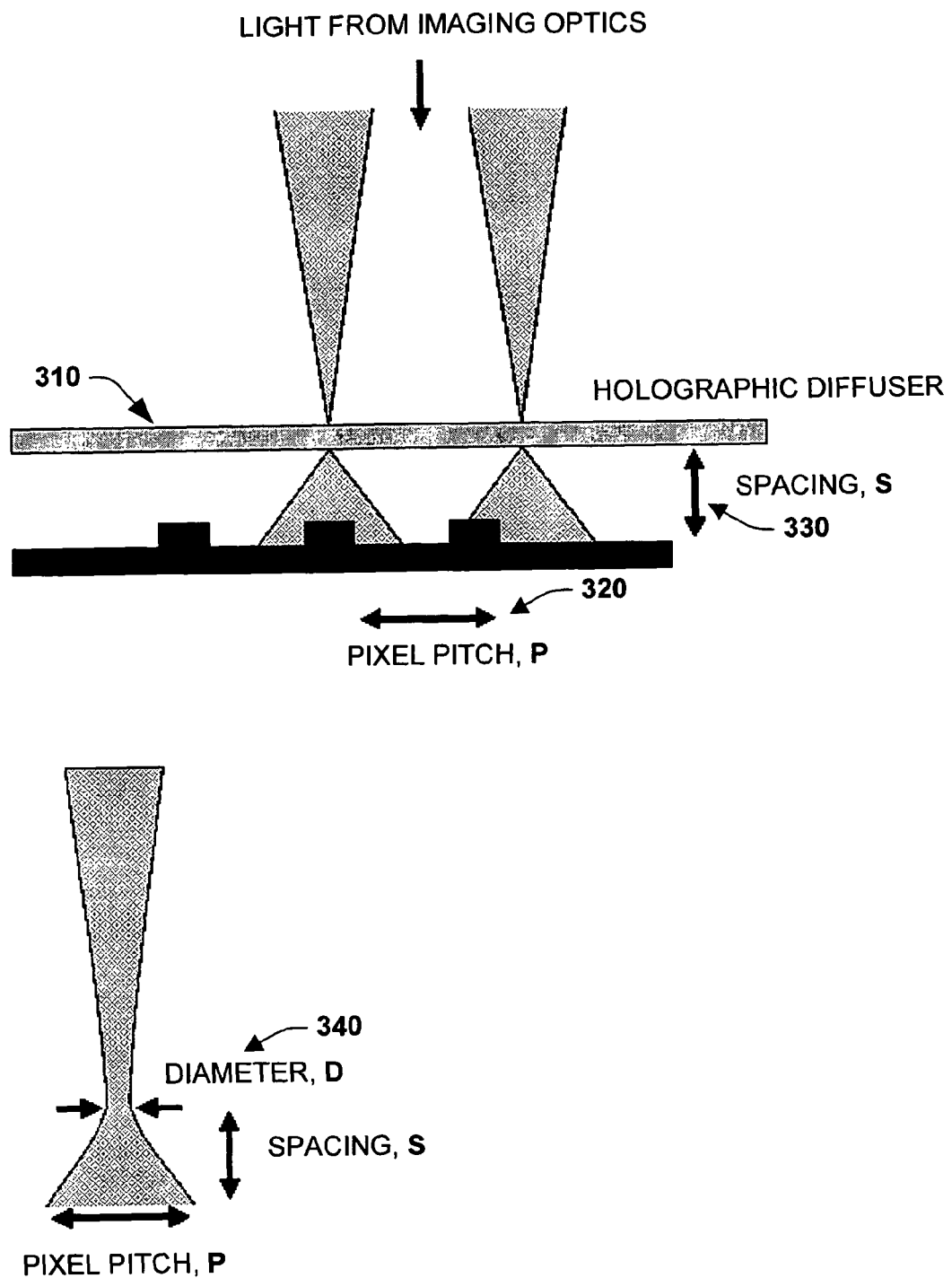
FIG. 3 illustrates holographic diffuser and sensor design parameters in accordance with an aspect of the invention.

FIG. 3 illustrates holographic diffuser and sensor design parameters. A diffuser 310 can be selected in accordance with a pixel pitch parameter P, illustrated at 320 and a spacing parameter S, illustrated at 330. The spacing parameter S refers to the distance between the point where diffusion begins and the receptive surface of the sensor. When a hologram in the upper surface of a coherent scattering medium effects diffusion, S is the distance between the upper surface of the coherent scattering medium and the receptive surface of the sensor. In this case, a diffusion half angle A, can be selected according to the following equation:

Diffusion half angle, $A$, where $\tan(A)=(P/2)/S$.

For more precise geometry, one may account for the size of an image spot or point as a parameter D or diameter illustrated at 340 along with spacing S and pixel pitch P. In this case, a diffusion half angle A, can be selected according to the following equation:

Diffusion half angle, $A$, where $\tan(A)=(P-D)/(2*S)$.

Generally speaking, the equations can be employed to position the coherent scattering medium relative to the pixelated sensor. In one embodiment, in the above equations, S is about 0.1 micron or more and about 30 mm or less. In another embodiment, in the above equations, S is about 0.3 microns or more and about 10 mm or less. In another embodiment, in the above equations, S is about 1 micron or more and about 5 mm or less.

The equations are particularly useful in making sensor systems; that is, positioning the coherent scattering medium with respect to the sensor to increase fill-factor. The equations are particularly useful in making devices that contain the sensor systems such as digital cameras.

As light passes through the coherent scattering medium, the coherent scattering medium creates a diffusion pattern, typically a spot, which contains the information contained in a point of radiation incident on the coherent scattering medium. That is, the coherent scattering medium smears uniformly points of light in that a point of light that would otherwise fall on the deadzone of a pixel is diffused/smeared (uniformly distributed or homogeneously smeared) into a pattern that is large enough to contact the active or photosensor region of a pixel. When a point of an image (light containing information of an object) contacts a surface of the coherent scattering medium, the hologram on the surface diffuses the image and the diffused image propagates to the sensor and contacts the sensor in a pattern that has a greater area than the point of an image that contacts the coherent scattering medium.

The diffused pattern generated by the coherent scattering medium is at least substantially uniform in that all areas of the pattern contain the same information contained in the point of an image that contacts the surface of the coherent scattering medium. The diffused pattern formed by the coherent scattering medium may have any shape, but is typically a circle. Examples of additional shapes of diffusion patterns include symmetric ovals, asymmetric ovals, ellipses, squares, rectangles, hexagons, multiple random shapes, and other polygons.

When a square or rectangle is formed, a light shaping diffuser is often employed. In one embodiment, when using a camera with circular/cylindrical lens(es), a light shaping diffuser acts as a circle to square/rectangle transform that facilitates the alignment of light to square/rectangle pixels. In some instances, generating a square or rectangle diffusion pattern mitigates cross-talk between pixels.

A pixel contains a photosensor region that transforms light signals into electrical signals and deadzone that contains circuitry and other matter that does not convert light into electricity. Generally, deadzone from one or more pixels functions to surround each photosensor region. The size or length of the deadzones between photosensor regions of pixels in a row is constant and may or may not be the same as the size or length of the deadzones between photosensor regions of pixels in a column. The maximum size of the diffusion pattern formed by the coherent scattering medium is just less than about the pixel pitch (size of the diffusion pattern being diameter for a circular pattern, major axis of an oval/ellipse, and diagonal for square/rectangle patterns). The minimum size of the diffusion pattern formed by the coherent scattering medium is just greater than the size of the point of an image that contacts the coherent scattering medium.

In one embodiment, the size of a diffusion pattern is at least about 10% of the length of the deadzone between photosensor regions of adjacent pixels in a row or column. In another embodiment, the size of a diffusion pattern is at least about 25% of the length of the deadzone between photosensor regions of adjacent pixels in a row or column. In another embodiment, the size of a diffusion pattern is at least about 50% or less than about 50% of the length of the deadzone between photosensor regions of adjacent pixels in a row or column. In another embodiment, the size of a diffusion pattern is at least about 75% of the length of the deadzone between photosensor regions of adjacent pixels in a row or column. In another embodiment, the size of a diffusion pattern is at least about the length of the deadzone between photosensor regions of adjacent pixels in a row or column.

In one embodiment, the size of a diffusion pattern is just less than about the pixel pitch. In another embodiment, the size of a diffusion pattern is about 90% of the pixel pitch or less. In another embodiment, the size of a diffusion pattern is about 75% of the pixel pitch or less. In another embodiment, the size of a diffusion pattern is about 50% of the pixel pitch or less. In some instances, generating a diffusion pattern that is about 50% of the pixel pitch or less (or about 50% of the length of the deadzone between photosensor regions of adjacent pixels in a row or column) mitigates cross-talk between pixels. In another embodiment, the size of a diffusion pattern is about 25% of the pixel pitch or less.

The coherent scattering medium can be made of any suitable material that can transmit light (at least partially transparent, such as substantially transparent or transparent). General examples include organic polymers and inorganic glasses. Specific examples of the base material include one or more of polyesters, polycarbonates, polyolefins, acrylic glass (polymethyl methacrylates), polystyrenes, polyimides, polyesterimides, polyurethanes, polyamides, polyamideimides, epoxy resins, cellulose acetate butyrate, polyacrylates, urethane acrylates, epoxy acrylates, polyester acrylates, plastic-on-glass constructions, sol-gel glass, quartz glass, silicon, fused silica, ZnS, ZnSe, CaF, and doped silica glass (e.g., doped with one or more of fluorine, boron, phosphorus, etc.).

The transmission efficiency of the coherent scattering medium is sufficient to provide adequate light for the sensor to detect and subsequently form an image. In one embodiment, the transmission efficiency of the coherent scattering medium is at least about 80%. In another embodiment, the transmission efficiency of the coherent scattering medium is at least about 85%. In yet another embodiment, the transmission efficiency of the coherent scattering medium is at least about 90%.

Typically a hologram is formed on one surface of the coherent scattering medium, such as either the upper surface or the lower surface. However, it is possible to have holograms on both surfaces, or formed in the within the medium. For example, a surface relief hologram may be formed on a surface of coherent scattering medium. In one embodiment, the hologram is formed of non-periodic microstructures on the surface of the coherent scattering medium. A holographic recorded master tool can be used to replicate numerous coherent scattering media. Laser writing techniques, photolithography techniques, glass grinding techniques, and the like can additionally/also be employed to make the coherent scattering media.

The diffusion angle (2 times the divergence angle) of the coherent scattering medium is dependent, in part, on the distance from the sensor, the size of the pixels, and size of the photosensor regions. In one embodiment, the diffusion angle of the coherent scattering medium is about 0.5° or more and about 120° or less. In another embodiment, the diffusion angle of the coherent scattering medium is about 1° or more and about 90° or less. In yet another embodiment, the diffusion angle of the coherent scattering medium is about 5° or more and about 80° or less.

The coherent scattering medium can be in the form of a lens (e.g., Fresnel, convex, concave, cylindrical, total internal reflection, etc.), a film (positioned near a sensor or adhered to a sensor), a sheet, a prismatic structure, fiber optic cable(s), optical filter grating structure, and the like. The coherent scattering medium is positioned between an image transfer medium, such as a lens, series of lenses, fiber optics, optical integrated circuit, and a pixelated sensor. An air void may or may not exist between either the image transfer medium and the coherent scattering medium or between the coherent scattering medium and the pixelated sensor. In instances where the coherent scattering medium is directly attached to an image transfer medium or a pixelated sensor, a surface coupling agent or an adhesive may be employed.

In one embodiment, when the holographic optical element is made of an organic polymer, the thickness is about 0.1 micron or more and about 500 microns or less. In another embodiment, when the holographic optical element is made of an organic polymer, the thickness is about 0.2 microns or more and about 100 microns or less. In yet another embodiment, when the holographic optical element is made of an organic polymer, the thickness is about 0.3 micron or more and about 10 microns or less.

In one embodiment, when the holographic optical element is made of an inorganic glass, the thickness is about 0.01 mm or more and about 20 mm or less. In another embodiment, when the holographic optical element is made of an inorganic glass, the thickness is about 0.05 mm or more and about 10 mm or less. In yet another embodiment, when the holographic optical element is made of an inorganic glass, the thickness is about 0.1 mm or more and about 5 mm or less.

Examples of commercially available coherent scattering medium include those under the trade designation LSD® Light Shaping Diffusers, CTR® Beam Shaping Diffusers, VLSD™ Variable Light Shaping Diffusers, and DTF® Directional Turning Films, and specifically those under the trade designations PE3, PE4, PE5, PC5, PC10, PC15, PC20, PC30, PC60, PC125, PCS10, PCS20, AC30, AC60, AC80, AC125, ACUVT30, ACUVT60, GL1, GL2, and GL3, all available from Physical Optics Corporation of Torrance, Calif.; diffusers under the trade designation Engineered Diffuser™ high performance diffusers available from RPC Photonics Inc. of Rochester, N.Y.; holographic diffusers under the trade designation Holographic Display Components available from the DuPont Holographics unit of DuPont; holographic diffusers available from Edmund Optics Inc. of Barrington, N.J.; and plastic film diffusers under the trade designation TMD™ tailored microdiffuser films available from Wavefront Technology Inc. of Paramount, Calif.

Figure 4:
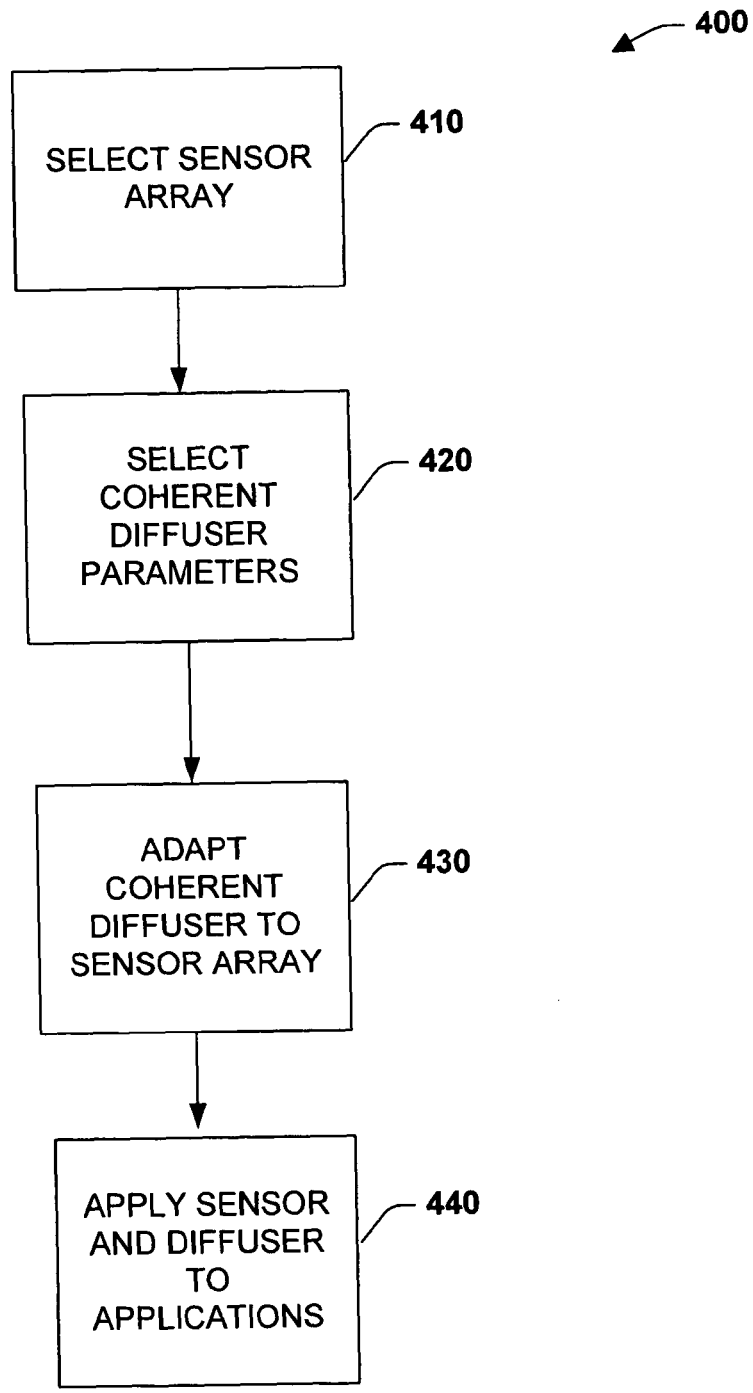
FIG. 4 is a flow diagram illustrating a coherent coupling methodology in accordance with an aspect of the invention.

FIG. 4 illustrates a coherent coupling methodology 400 in accordance with an aspect of the subject invention. While, for purposes of simplicity of explanation, the methodology is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Proceeding to 410, a sensor array is selected. As noted above, this can include substantially any type of pixelated sensor array such as a CCD sensor or a CMOS sensor for example. At 420, coherent diffuser parameters are selected. This can include determining pixel pitch dimensions P, given the sensor characteristics, spacing between the diffuser and the sensor S, as well as considerations of spot size diameters D, that may be expected at an image plane. From these parameters, a coherent diffuser such as a holographic diffuser can be selected by determining a diffusion half-angle parameter from the parameters P, S, and/or D. At 430, the coherent diffuser and the sensor are adapted to each other in accordance with the parameters described at 420. At 440, the sensor array and associated coherent diffuser are applied to one or more applications and/or devices. As previously noted, an image can be generated by outputting data from the sensor and storing the data in memory for direct display to a computer display and/or subsequent local or remote image processing and/or analysis within the memory.

Figure 5:
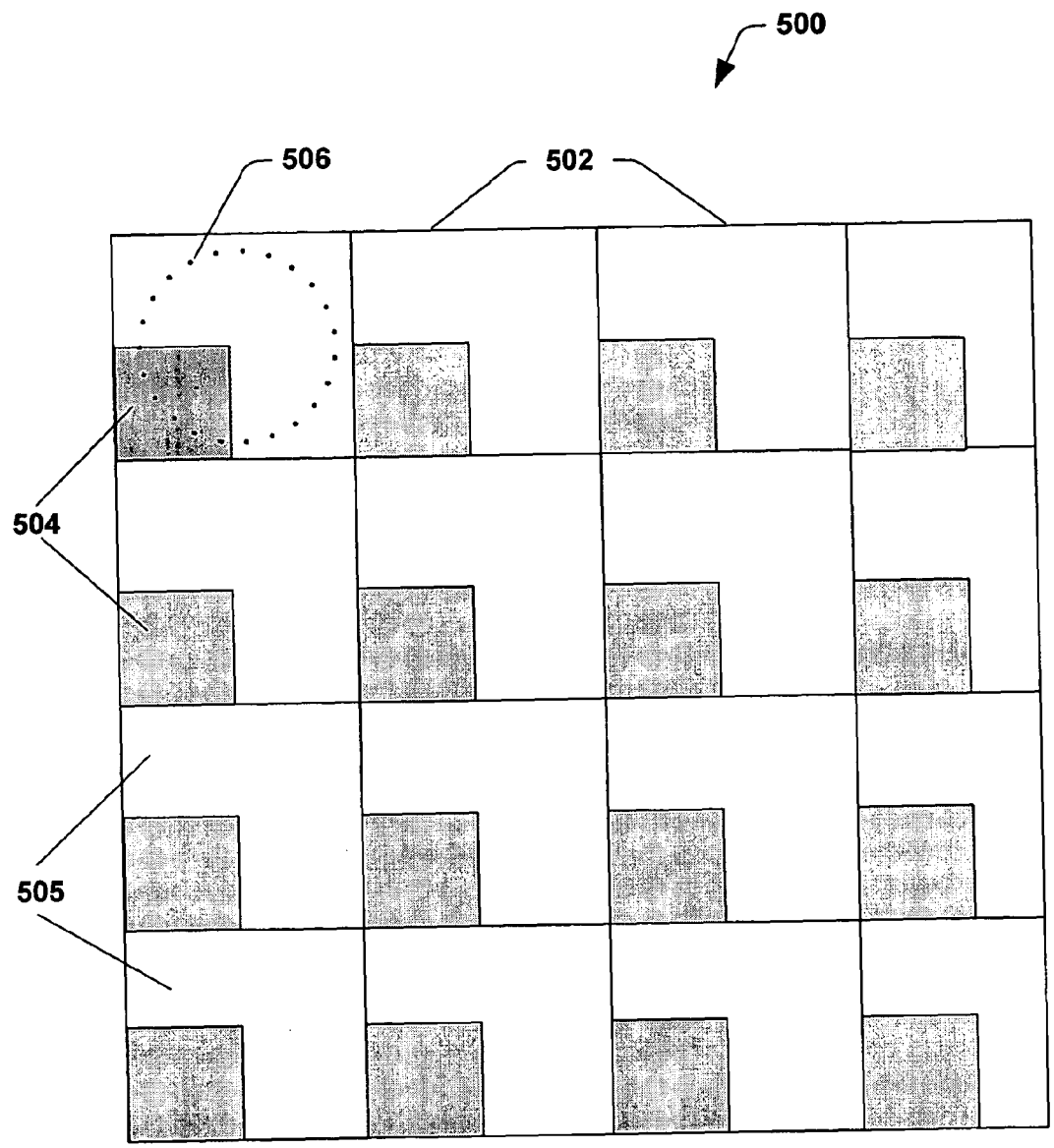
FIG. 5 illustrates principles of a coherent scattering medium in accordance with an aspect of the invention.

FIG. 5 illustrates an example of a diffusion pattern from a coherent scattering medium on a portion of a sensor from a top-down view. A portion of a sensor 500 is shown containing pixels 502. Each pixel 502 contains a photosensor region 504 and a deadzone 505. A coherent scattering medium (not shown) is positioned above the sensor 500 in a plane substantially parallel with the plane of the paper. A diffusion pattern 506 formed by the coherent scattering medium is projected on the sensor. In this example, the diffusion pattern 506 is in the shape of a circle and has a diameter just less than the pixel pitch. In this example, virtually all information (in the form of light) contacts photosensor regions 504 of the pixels 502 due to the smearing effect of the coherent scattering medium. That is, only a very small amount of information, if any, only contacts the deadzones 505 without contacting the photosensor regions 504.

Figure 6:
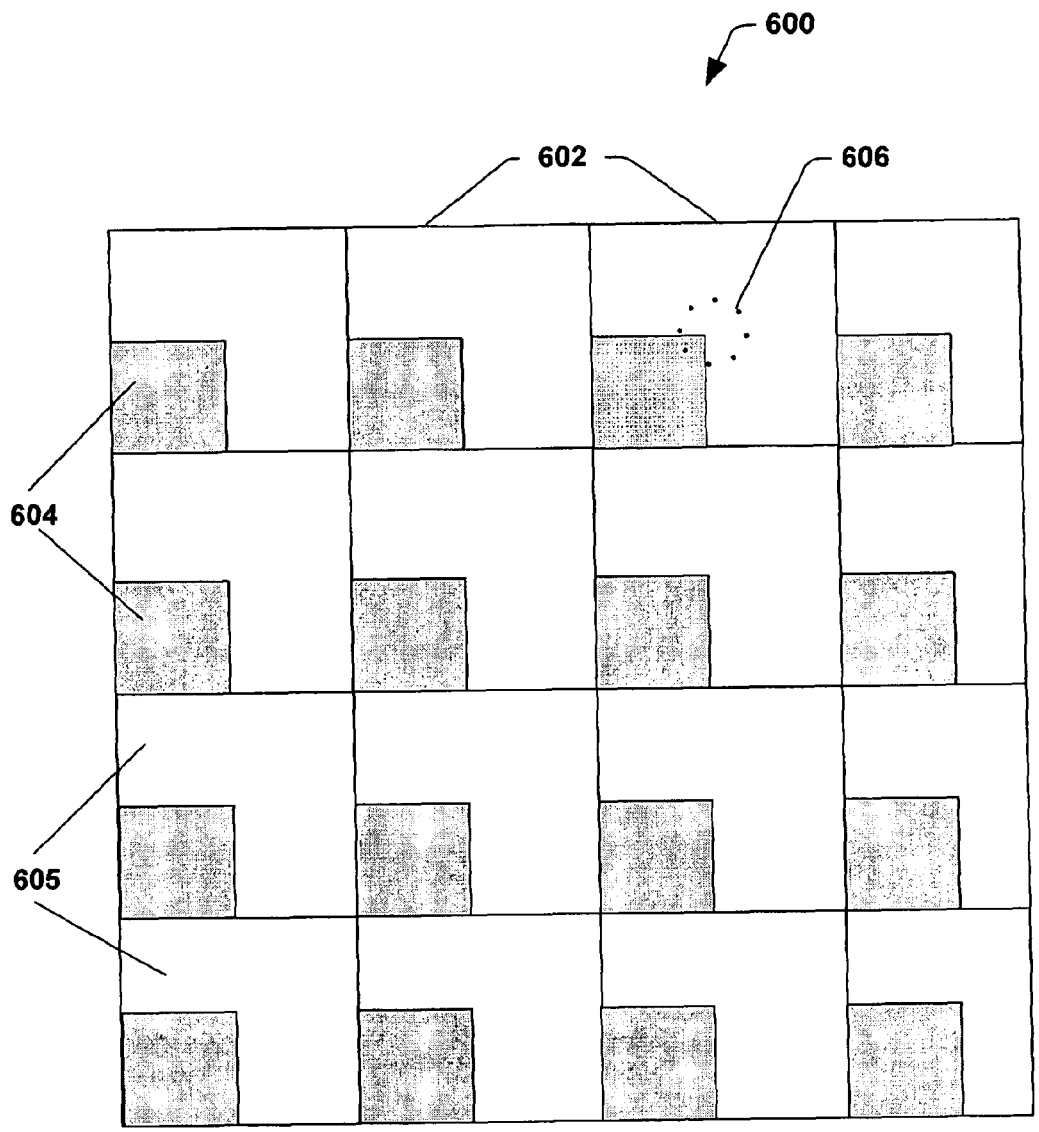
FIG. 6 illustrates principles of a coherent scattering medium in accordance with an aspect of the invention.

FIG. 6 illustrates another example of a diffusion pattern from a coherent scattering medium on a portion of a sensor from a top-down view. A portion of a sensor 600 is shown containing pixels 602. Each pixel 602 contains a photosensor region 604 and a deadzone 605. A coherent scattering medium (not shown) is positioned above the sensor 600 in a plane substantially parallel with the plane of the paper. A diffusion pattern 606 formed by the coherent scattering medium is projected on the sensor. In this example, the diffusion pattern 606 is in the shape of a circle and has a diameter less than the length of the deadzone. In this example, although some information is lost in the deadzones 605, an increased amount of information contacts photosensor regions 604 of the pixels 602 than would otherwise contact the photosensor regions 604 if a coherent scattering medium were not employed. In instances where preserving brightness is a primary concern, smaller diffusion patterns may be employed.

Figure 7:
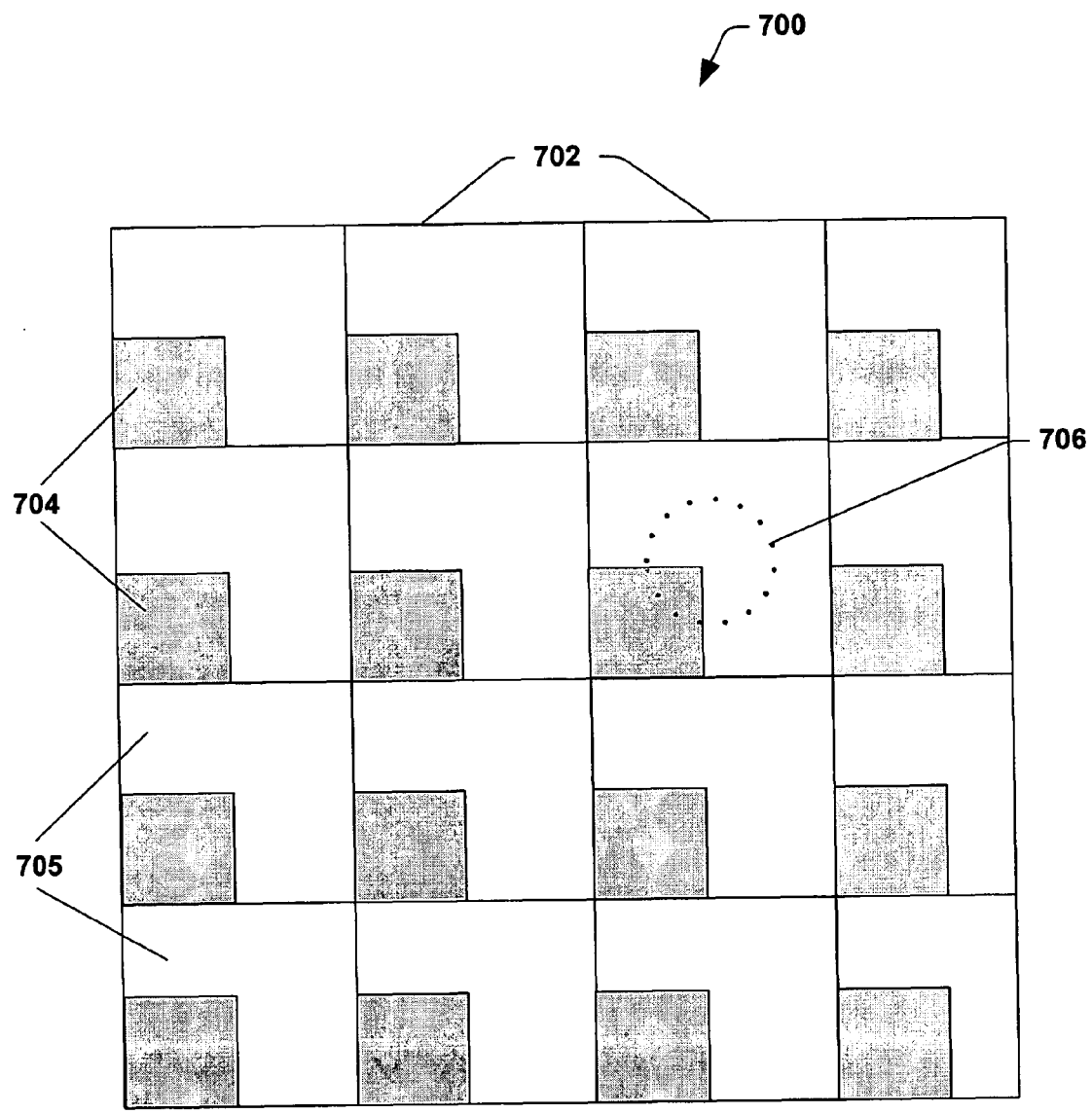
FIG. 7 illustrates principles of a coherent scattering medium in accordance with an aspect of the invention.

FIG. 7 illustrates an example of a diffusion pattern from a coherent scattering medium on a portion of a sensor from a top-down view. A portion of a sensor 700 is shown containing pixels 702. Each pixel 702 contains a photosensor region 704 and a deadzone 705. A coherent scattering medium (not shown) is positioned above the sensor 700 in a plane substantially parallel with the plane of the paper. A diffusion pattern 706 formed by the coherent scattering medium is projected on the sensor. In this example, the diffusion pattern 706 is in the shape of a circle and has a diameter just greater than the length of the deadzone. In this example, substantially all information contacts photosensor regions 704 of the pixels 702 due to the smearing effect of the coherent scattering medium. That is, only small amounts of information contact the deadzones 705 without contacting the photosensor regions 704.

Figure 8:
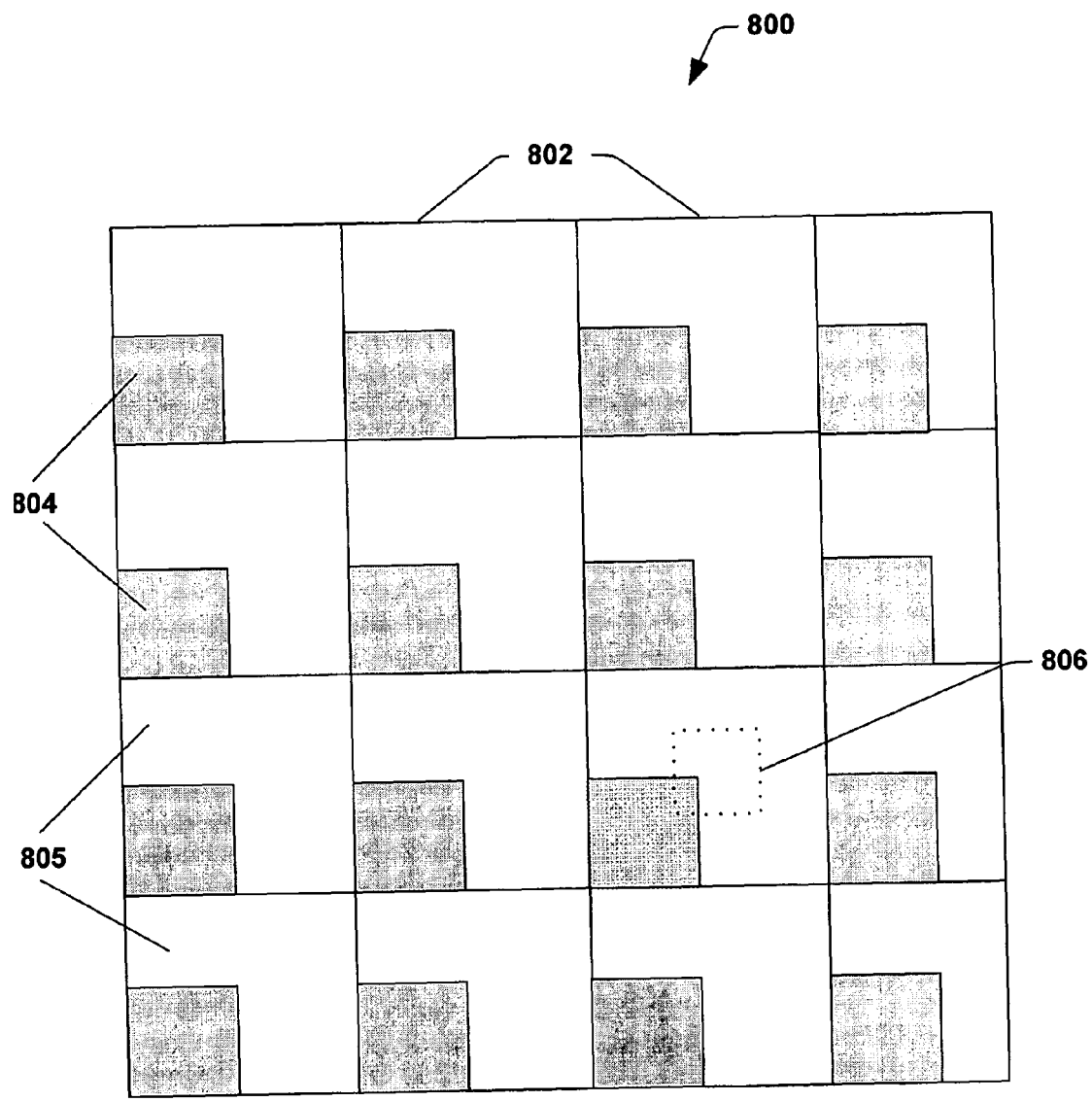
FIG. 8 illustrates principles of a coherent scattering medium in accordance with an aspect of the invention.

FIG. 8 illustrates an example of a diffusion pattern from a coherent scattering medium on a portion of a sensor from a top-down view. A portion of a sensor 800 is shown containing pixels 802. Each pixel 802 contains a photosensor region 804 and a deadzone 805. A coherent scattering medium (not shown) is positioned above the sensor 800 in a plane substantially parallel with the plane of the paper. A diffusion pattern 806 formed by the coherent scattering medium is projected on the sensor. In this example, the diffusion pattern 806 is in the shape of a square and has a diagonal length greater than the length of the deadzone. In this example, substantially all information contacts photosensor regions 804 of the pixels 802 due to the smearing effect of the coherent scattering medium. That is, only small amounts of information contact the deadzones 805 without contacting the photosensor regions 804.

Figure 9:
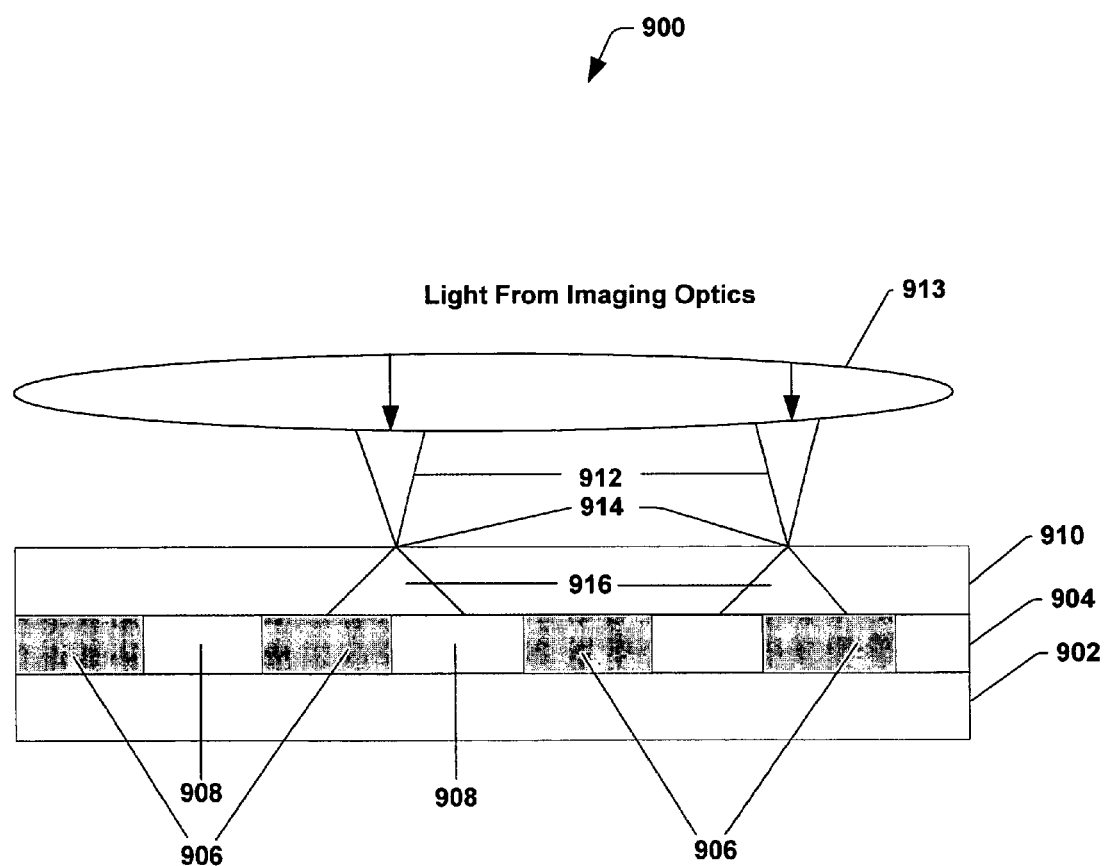
FIG. 9 illustrates an image detector system in accordance with an aspect of the invention.

FIG. 9 illustrates an image detector system 900 in accordance with an aspect of the invention. The image detector system is well suited for a digital camera. An image is presented to the surface of a sensor 902 having a plurality of pixels 904 having photosensor regions 906 and deadzones 908. A coherent scattering medium 910 is positioned above the sensor 902 in a plane substantially parallel with the sensor 902. In this embodiment, the coherent scattering medium 910 is a film formed directly over the sensor 902, so that a void does not exist between the coherent scattering medium 910 and the sensor 902/pixels 904.

Light (or energy) 912 from imaging optics contacts (e.g., passes through a lens 913) and contacts the coherent scattering medium 910 at numerous points, but only points 914 are specifically illustrated to facilitate this explanation. A hologram (not shown) on the upper surface of the coherent scattering medium 910 functions to uniformly diffuse each point of light at a diffusion angle to generate diffusion patterns 916 that are projected onto the sensor 902. The diffusion angle can be computed such that a minimal-sized spot in the image plane (close to diffraction limited, or at the resolving ability of the lenses) is diffused to cover about the size of a single pixel interval down to a size just greater than a point 914.

Since each point 914 is converted into a diffusion pattern 916, light that would otherwise fall on the deadzone 908 of a pixel 904, such as the left point 914, and not be detected and used to form a digital image, is contacted with a photosensor region 906.

In accordance with the concepts described above in relation to the Figures, a plurality of related imaging applications can be enabled and enhanced. For example, these applications and related methodologies can include but are not limited to imaging, control, inspection, microscopy, telescopes, and/or other analysis such as:

(1) Bio-medical analysis (e.g., cell colony counting, histology, frozen sections, cellular cytology, Haematology, pathology, oncology, fluorescence, interference, phase and many other clinical microscopy applications);

(2) Particle Sizing Applications (e.g., Pharmaceutical manufacturers, paint manufacturers, cosmetics manufacturers, food process engineering, and others);

(3) Air quality monitoring and airborne particulate measurement (e.g., clean room certification, environmental certification, and so forth);

(4) Optical defect analysis, and other requirements for inspection of transmissive and opaque materials (as in metallurgy, semiconductor inspection and analysis, machine vision systems and so forth); and (5) Imaging technologies such as digital cameras, digital video cameras, devices that contain digital cameras such as cellular/mobile telephones, telephones, computers, copiers, fax machines and medical systems.

What has been described above are preferred aspects of the subject invention. It is, of course, not possible to describe every conceivable combination of components or methodologies for purposes of describing the subject invention, but one of ordinary skill in the art will recognize that many further combinations and permutations of the subject invention are possible. Any feature described above can be combined with any other feature described herein. Accordingly, the subject invention is intended to embrace all such alterations, modifications and variations that fall within the spirit and scope of the appended claims.

What is claimed is:

1. A digital camera, comprising:
an image transfer medium;
a sensor comprising pixels, each pixel comprising a photosensor region and a deadzone, the pixels having a pixel pitch; and
a coherent scattering medium between the image transfer medium and the sensor, the coherent scattering medium operative to propagate a diffusion pattern of electromagnetic radiation to the sensor, the diffusion pattern at the sensor having a size of at least about 10% of a length of the deadzone between photosensor regions of adjacent pixels in a row of pixels and less than about the pixel pitch and about 90% of the pixel pitch or less.

2. The digital camera of claim 1, the coherent scattering medium comprises a hologram.

3. The digital camera of claim 1, the coherent scattering medium is positioned relative to the sensor via the following equation: Tan (A) =(P−D)/(2*S), wherein A represents a diffusion half angle, P represents the pixel pitch, S represents a distance between the coherent scattering medium and the sensor, and D represents a size of an image spot as it contacts the coherent scattering medium.

4. The digital camera of claim 1, the coherent scattering medium is positioned relative to the sensor via the following equation: Tan (A) =(P/2)/S, wherein A represents a diffusion half angle, P represents the pixel pitch, and S represents a distance between the coherent scattering medium and the sensor.

5. The digital camera of claim 1, the coherent scattering medium comprises at least one selected from the group consisting of polyesters, polycarbonates, polyolefins, polymethyl methacrylates, polystyrenes, polyimides, polyesterimides, polyurethanes, polyamides, polyamideimides, epoxy resins, cellulose acetate butyrate, polyacrylates, urethane acrylates, epoxy acrylates, polyester acrylates, sol-gel glass, quartz glass, fluorine doped silica glass, boron doped silica glass, and phosphorus doped silica glass.

6. The digital camera of claim 1, the diffusion pattern at the sensor having a size of at least about 25% of a length of the deadzone between photosensor regions of adjacent pixels in a row of pixels and about 90% or less of the pixel pitch.

7. The digital camera of claim 1, the diffusion pattern having a shape selected from the group consisting of symmetric ovals, asymmetric ovals, ellipses, squares, rectangles, and hexagons.

8. The digital camera of claim 1, the sensor comprising at least one of a CCD sensor, a CMOS sensor, a CID sensor, and a linear scan sensor.

9. The digital camera of claim 1, further comprising a processor and a memory to receive an output from the pixelated sensor array, the processor storing the output in the memory.

10. The digital camera of claim 1, the image transfer medium comprising at least one lens.

11. The digital camera of claim 1, the coherent scattering medium positioned in contact with the sensor.

12. The digital camera of claim 1, an air void present between the coherent scattering medium and the sensor.

13. A mobile telephone comprising the digital camera of claim 1.

14. A digital video camera, comprising
at least one lens;
a sensor comprising pixels, each pixel comprising a photosensor region and a deadzone, the pixels having a pixel pitch; and
a coherent scattering medium between the at least one lens and the sensor, the coherent scattering medium operative to project a diffusion pattern of electromagnetic radiation to the sensor, the diffusion pattern at the sensor having a size of at least about 10% of a length of the deadzone between photosensor regions of adjacent pixels in a column of pixels and less than about the pixel pitch and about 90% of the pixel pitch or less.

15. The digital video camera of claim 14, the diffusion pattern of electromagnetic radiation comprises a uniform distribution of the electromagnetic radiation.

16. The digital video camera of claim 14, the coherent scattering medium comprises an inorganic glass having a thickness of about 0.01 mm or more and about 20 mm or less or an organic polymer having a thickness of about 0.1 micron or more and about 500 microns or less;
wherein the inorganic glass is comprised of sol-gel glass, quartz glass, fluorine doped silica glass, boron doped silica glass, and phosphorus doped silica glass; or
wherein the organic polymer is comprised of polyesters, polycarbonates, polyolefins, polymethyl methacrylates, polystyrenes, polyimides, polyesterimides, polyurethanes, polyamides, polyamideimides, epoxy resins, cellulose acetate butyrate, polyacrylates, urethane acrylates, epoxy acrylates, polyester acrylates.

17. A method of making a digital camera, comprising:
positioning a coherent scattering medium between an image transfer medium and a sensor, the sensor having a pixel pitch, the coherent scattering medium operative to propagate a diffusion pattern of electromagnetic radiation to the sensor, the diffusion pattern at the sensor having a size less than about the pixel pitch and about 90% of the pixel pitch or less.

18. The method of claim 17, positioning the coherent scattering medium comprises using at least one of equations:
Tan (A) =(P−D)/(2*S), wherein A represents a diffusion half angle, P represents the pixel pitch, S represents a distance between the coherent scattering medium and the sensor, and D represents a size of an image spot as it contacts the coherent scattering medium; and
Tan (A) =(P/2)/S, wherein A represents a diffusion half angle, P represents the pixel pitch, and S represents a distance between the coherent scattering medium and the sensor.

19. The method of claim 17, S in either equation is about 0.1 micron or more and about 30 mm or less.

20. The method of claim 17, comprising affixing the coherent scattering medium on the sensor.

21. The method of claim 17, comprising suspending the coherent scattering medium to avoid contact with the sensor.

* * * * *